United States Patent [19]

Kawahara et al.

[11] Patent Number: 5,188,907
[45] Date of Patent: Feb. 23, 1993

[54] MAGNETIC RECORDING MEDIUM

[75] Inventors: Setsuko Kawahara; Yasushi Nakano; Yuji Shimizu; Yasuhisa Yamauchi, all of Hino, Japan

[73] Assignee: Konica Corporation, Tokyo, Japan

[21] Appl. No.: 734,912

[22] Filed: Jul. 24, 1991

Related U.S. Application Data

[63] Continuation-in-part of Ser. No. 637,224, Jan. 3, 1991, abandoned.

[51] Int. Cl.[5] .............................................. G11B 23/00
[52] U.S. Cl. ..................................... 428/694; 428/900
[58] Field of Search ................................. 428/694, 900

[56] References Cited

U.S. PATENT DOCUMENTS 4,624,883 11/1986 Yamaguchi et al. ................. 428/329
4,847,147 7/1989 Aonuma et al. ..................... 428/900

Primary Examiner—Paul J. Thibodeau
Assistant Examiner—Leszek Kiliman
Attorney, Agent, or Firm—Jordan B. Bierman

[57] ABSTRACT

A magnetic recording medium is disclosed which is excellent in video and audio signal output as well as in S/N ratio. The recording medium comprises first and second magnetic layers provided on a support in this order from said support and the first magnetic layer has a SFD value of from 0.38 to 0.60 and the second magnetic layer has a SFD value of from 0.30 to 0.45, wherein SFD is defined as follows:

$$SFD = \Delta H / Hc$$

where $\Delta H$ is a half-width of magnetic field at the extreme value of differential coefficient of a magnetic induction-magnetic field hysterisis curve, and Hc is a coercive force of a magnetic material.

4 Claims, 4 Drawing Sheets

$$SFD = \frac{\Delta H}{Hc}$$

MAGNETIC RECORDING MEDIUM

This application is a continuation-in-part of application Ser. No. 07/637,224, filed Jan. 3, 1991, now abandoned.

FIELD OF THE INVENTION

The present invention relates to a magnetic recording medium such as a magnetic tape, a magnetic sheet and a magnetic disc.

BACKGROUND OF THE INVENTION

Generally, a magnetic recording medium such as a magnetic tape is prepared by coating on a support a magnetic paint comprising a magnetic powder and a binder and drying it. In a conventional magnetic recording medium having a single layer, a broad frequency range from low to high range must be covered by only one kind of magnetic layer. Particularly in the recent trend toward high density recording where a lower noise and a higher recording performance in a high frequency range are required, there is used a magnetic powder having a high Hc and a high BET value. And in a single-layered recording medium, a chroma and audio output are liable to be disregarded because much importance is given to properties in a high frequency range.

However, a magnetic recording medium having a single magnetic layer, or a single magnetic powder, tends to be forced to use a magnetic powder with a high Hc and high BET value for higher properties in a high frequency range, thereby properties in a low frequency range is eventually left unsatisfactory.

In the magnetic recording medium for a video tape, magnetic media having plural magnetic layers to increase a recording capacity and balance the magnetic recording properties in both high and low frequency ranges are proposed in Japanese Patent Publication Open to Public Inspection Nos. 98803/1973, 172142/1984, 64901/1976, 56228/1983, 200425/1983, 146211/1988, 300425/1988, and Japanese Patent Examined Publication Nos. 2218/1957 and 12937/1981.

In these published technique, multi-layer recording media are designed to allot recording functions separately to an uppermagnetic layer and a lower magnetic layer, so that the upperlayer deals with video output and the lower layer manages a chroma and audio output.

These magnetic recording media, though having the above features and capable of achieving a high output of a video or image signal and a chroma or color signal, are still unsatisfactory in dispersion of magnetic particles, leaving problems of a poor S/N ratio owing to an excessive noise component.

SUMMARY OF THE INVENTION

The object of the present invention is to provide a magnetic recording medium excellent in output of video and color signals as well as in S/N ratios.

The present invention relates a magnetic recording medium having on a support the first and the second magnetic layers in this order, wherein with respect to a magnetic condition expressed by $$SFD = \Delta H / Hc$$

where $\Delta H$ denotes a half-width of a magnetic field at an extreme value of a differential coefficient of a magnetic induction-magnetic field hysteresis curve, and Hc denotes a coercive force, the SFD of the first magnetic layer shown by $SFD_1$ and the SFD of the second magnetic layer shown by $SFD_2$ are respectively in the ranges of $$0.38 \leq SFD_1 \leq 0.60$$

$$0.30 \leq SFD_2 \leq 0.45$$

BRIEF DESCRIPTION OF THE DRAWINGS

The figures used here are illustrative examples of the present invention. FIGS. 1-(a) and 1-(b) show a magnetization curve, hysteresis curve and differential curve to explain the definition of SFD. FIGS. 5-(A), 5-(B) and 5-(C) are schematic diagrams of respective extrusion coaters.

DETAILED DESCRIPTION OF THE INVENTION

The foregoing SFD of the present invention will be explained. The magnetic condition of a laminated magnetic layer comprising the first and the second magnetic layers as shown above is given on the basis of a SFD (Switching Field Distribution).

Figure 1:
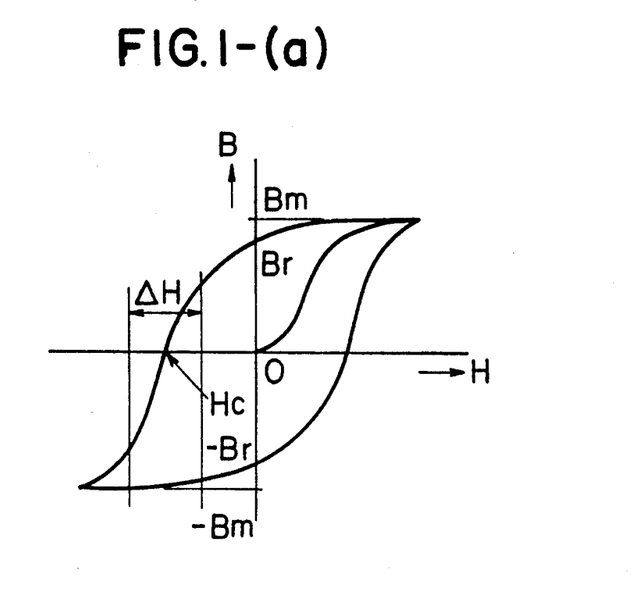

FIG. 1-(a) shows a magnetization hysteresis curve (flux density-magnetic field) of a magnetic material, where the relation between a flux density (B) and a magnetic field(H) is given by the following expression:

$$B = \mu_d \mu_o H$$

where $\mu_o$ is a magnetic permeability in vacuum, $\mu_d$ is a specific permeability in a medium.

A differential coefficient of the flux density with respect to the magnetic field is given as follows from the above expression:

$$\mu_d = (1/\mu_o) \frac{dB}{dH} \quad (1)$$

where, $\mu_d$ is referred to as a differential magnetic permeability.

On the other hand, a differential curve based on a hysteresis curve makes a loop having an extreme value shown in FIG. 1-(b).

When a half-width of a magnetic field at this extreme value is denoted by $\Delta H$, the SFD is defined as follows:

$$SFD = \Delta H / Hc \quad (2)$$

These expressions (1) and (2) relate a magnetic permeability to a SFD and to a magnetic field by means of a differential curve and a half-width at its extreme value, thereby a magnetic permeability can be known from readily measurable Hc and $\Delta H$, namely a SFD. When a magnetic particle is considered to be a medium of said magnetic permeability, it is related by these expressions to an Hc fluctuation owing to composition of the magnetic body or a crystal defect in the magnetic body such as cavities. When a magnetic layer is regarded to be such a medium, it is connected to an Hc fluctuation owing to magnetic conditions such as a filling rate of magnetic particles, density in the number of particles and distensibility of particles. Therefore, the SFD is regarded as a parameter indicating a fluctuation in Hc.

According to the expression (2), the SFD and the Hc are reciprocal to each other. While said reciprocity is not always ensured depending upon the behavior of H, no contrary evidence to the reciprocity has been found so far in experiments and in hysteresis curves; therefore, the SFD gets larger as the Hc becomes smaller.

Experiments up to now show that a magnetic particle having a larger BET value gives a larger SFD. The term "BET value" used here means a specific surface area of a magnetic powder and indicates a surface area measured by a measuring method of a specific surface area called the BET method, in square meters per a unit gram of a magnetic body. The specific surface area and a measuring method thereof are explained in detail in "Fine Particle Measurement" by J.M. Dallavalle and Clydeorr Jr. (translated by Benda et al., published by Sangyo Tosho Co.) and on page 1170–1171 of "Handbook of Chemistry, Volume for Application" (edited by Japanese Chemical Society, published by Maruzen Co. in 1966). The specific surface area can be measured, for example, by steps of degassing a powder under heating at about 105° C. for 13 minutes to remove gases adsorbed by it, putting the powder into a measuring apparatus (Quantersorp made by Yuasa Ionix Co.), setting the initial nitrogen pressure at 0.5 kg/m$^2$, and measuring absorption of nitrogen for 10 minutes at a temperature of liquid nitrogen ($-195°$ C.).

Switching Field Distribution (SFD) is described below. The magnetic properties of magnetic powder and magnetic tapes include coercive force Hc and magnetic flux density B. Hc is the value for H obtained when the positive magnetic flux density B of a tape becomes zero upon applying a reverse magnetic field (negative magnetic field) to the tape. In general, the suitability of the tape for high frequency recording increases as the Hc increases.

It should be noted, however, that the Hc of the tape in question is the average value of Hc for the individual particles of the magnetic powder dispersed in the magnetic layer. Moreover, even if the individual particles of the magnetic powder have a particular value of Hc, the position of cache particle in the magnetic layer varies depending upon the dispersion, coating, orientation and drying conditions in the manufacturing process, and this difference in position and orientation can result in a difference in the Hc of the individual particles of the magnetic powder and the tape.

The Hc of a tape is obtained as the average value for individual particles of the magnetic powder in the magnetic layer. The SFD value serves as an index of the degree of variance of the Hc in these individual particles. In other words, eve when different tapes have an equivalent Hc value, they can have different SFD values according to the differences in magnetic powder properties and video tape production conditions.

It is found that the noise component of a video signal becomes the lowest when the SFD of a magnetic layer ranges from 0.30 to 0.45 and that of a color signal becomes the lowest when the SFD of a magnetic layer is in a range of 0.38 to 0.60, respectively. That is, when the SFD of the first magnetic layer in the foregoing laminated magnetic layer (the lower layer) is denoted by $SFD_1$ and the SFD of the second magnetic layer (the upper layer) is denoted by $SFD_2$, the following relations are given:

$$0.38 \leq SFD_1 \leq 0.60$$

$$0.30 \leq SFD_2 \leq 0.45$$

These ranges are preferably $$0.40 \leq SFD_1 \leq 0.55$$

$$0.32 \leq SFD_2 \leq 0.42$$

more preferably $$0.45 \leq SFD_1 \leq 0.52$$

$$0.32 \leq SFD_2 \leq 0.38$$

The $SFD_1$ value is determined as follows: A magnetic paint for lower layer to be determined is coated to form a dry coating thickness of 3.0 μm on a support, 14.3 μm thick polyethylene terephthalate film, and dried. A magnetic hysterisis curve of the sample thus prepared is measured by an ordinary method for measuring a hysterisis curve of magnetic substance using a vibrating-sample magnetometer. VSM-3S produced by TQEI KOGYO Co., Ltd. From the hysterisis curve, a $SFD_1$ value of the sample is calculated by the forgoing procedure.

The $SFD_2$ value is determined by the same manner as in the $SFD_1$ value except that a magnetic paint for upper layer is used in place of the magnetic paint for lower layer.

In the present invention, the above SFDs of respective magnetic layers can be attained by selecting the SFD of a magnetic powder and controlling the dispersing time in a dispersing means such as a ball mill.

Also, the Hc has favorable ranges; that is, a magnetic recording medium whose video and color signals are excellent in both of output and a S/N ratio can be obtained by making the Hc of the first magnetic layer 500 to 680 Oe and the Hc of the second magnetic layer 630 to 750 Oe.

Since the magnetic layer of the invention has a multilayer structure, each of the magnetic structural layers can be formed to have different functions: the upper magnetic layer or the second magnetic layer is made to be good in recording and playbacking properties such as a video output in a high frequency range, and the lower layer or the first magnetic layer is made to be good in recording and playbacking properties such as a chroma and audio output in a low frequency range. For this purpose, it is generally desirous that the coercive force (Hc) of the upper layer, particularly the uppermost layer, be larger than that of the lower layer, and that the thickness of the upper layer be thin, preferably 0.6 μm or less. Further, the thickness of the lower layer adjacent to the upper layer is preferably 1.5 to 4.0 μm.

In the invention, except for a clear boundary materially existing, there exists between magnetic layers a boundary region having a certain thickness in which magnetic powders of the two layers are mixed together. A layer excluding such a boundary region is defined as the foregoing upper layer or lower layer.

Figure 2:
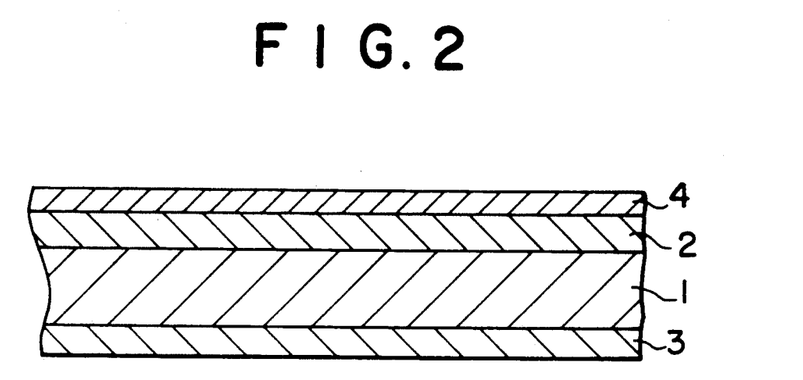
FIGS. 2 and 3 are cross-sectional drawings of examples of the magnetic recording medium.
Figure 3:
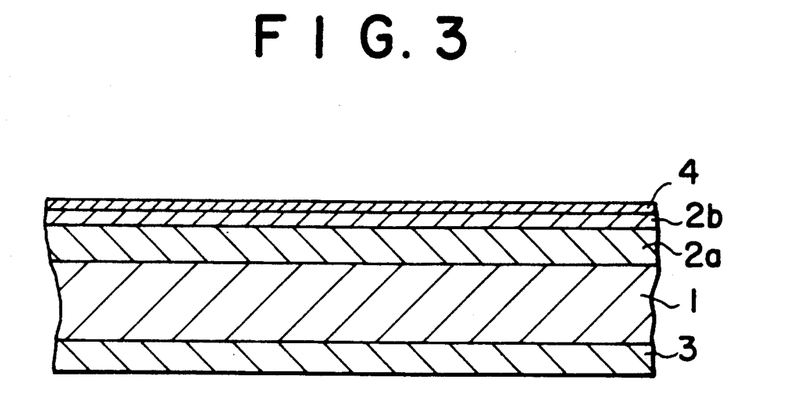

An example of the magnetic recording medium of the invention is shown in FIG. 2, in which the first magnetic layer (the lower layer) 2 and the second magnetic layer (the uppermost layer) 4 are laminated in this sequence on a non-magnetic support 1 which is made of polyethylene terephthalate or the like. On the opposite side of the support, a backcoat layer 3 is provided. An overcoat layer may be provided on the second magnetic layer. FIG. 3 illustrates another example, in which the lower layer is further divided into a layer 2a and a layer 2b.

In the magnetic recording media shown in FIGS. 2 and 3, the thickness of the first magnetic layer 2 and that of the magnetic layer $2a+2b$ are preferably 1.5 to 4.0 $\mu m$, and the thickness of the second magnetic layer is preferably 0.6 $\mu m$ or less, for example, 0.5 $\mu m$.

The magnetic layers 2, 2a, 2b and 4 contain a magnetic powder. Examples of such magnetic powders include iron oxide magnetic powders such as $\gamma$-$Fe_2O_3$, Co-containing $\gamma$-$Fe_2O_3$, $Fe_3O_4$, Co-containing $Fe_3O_4$; and magnetic metal powders containing Fe, Ni or Co as a main component such as Fe, Ni, Co, Fe-Ni-Co alloy, Fe-Ni alloy, Fe-Al alloy, Fe-Al-Ni alloy, Fe-Al-Co alloy, Fe-Mn-Zn alloy, Fe-Ni-Zn alloy, Fe-Al-Ni-Co alloy, Fe-Al-Ni-Cr alloy, Fe-Al-Co-Cr alloy, Fe-Co-Ni-Cr alloy, Fe-Co-Ni-P alloy and Co-Ni alloy. The SFDs of the uppermost magnetic layer 4 and the other magnetic layers 2, 2a, 2b are respectively set according to the invention.

Among the foregoing magnetic powders, one suitable to each of the magnetic layers 2, 2a, 2b and 4 may be selected. For example, a high output recording medium can be prepared by using in the uppermost layer 4 a magnetic powder having a coercive force (Hc) higher than that used in the lower layer 2.

There may be contained in these magnetic layers a lubricant such as a silicone oil, graphite, molybdenum disulfide, tungsten disulfide, a monobasic fatty acid having 12 to 20 carbon atoms, e.g., stearic acid, a fatty ester having 13 to 40 carbon atoms; a dispersant such as lecithin; a abrasive such as fused alumina; and an antistatic agent such as carbon black.

Binders usable in the magnetic layers 2, 2a, 2b and 4 are preferably those having an average molecular weight of 10,000 to 200,000, of which examples include vinyl chloride-vinyl acetate copolymers, vinyl chloride-vinylidene chloride copolymers, vinyl chloride-acrylonitrile copolymers, polyvinyl chlorides, urethane resins, butadiene-acrylonitrile copolymers, polyamide resins, polyvinyl butyrals, cellulose derivatives such as cellulose acetate butylate, cellulose diacetate, cellulose triacetate, cellulose propionate and nitrocellulose, styrene-butadien copolymers, polyester resins, synthetic rubbers of various kinds, phenol resins, epoxy resins, urea resins, melamine resins, phenoxy resins, silicone resins, acrylic reactive resins, mixtures of a high molecular weight polyester resin and an isocyanate prepolymer, mixtures of a polyester polyol and a polyisocyanate, urea formaldehyde resins, mixtures of a low molecular weight glycol/a high molecular weight glyco-/an isocyanate, and mixtures of the foregoing.

These binders are preferably resins containing a hydrophilic polar group such as $-SO_3M$, $-COOM$ or $-PO(OM')_2$, where M is a hydrogen atom, or an alkali metal including lithium, potassium, sodium; M' is a hydrogen atom, or an alkali metal such as lithium, potassium, sodium, or a hydrocarbon residue. These hydrophilic polar groups enhance the compatibility of the resins with the magnetic powder, and thereby the dispersibility of the magnetic powder is further improved and the aggregation of the magnetic powder can be prevented. This increases the stability of a magnetic paint and leads to the improvement of durability of the recording medium.

Of these binders, vinyl chloride copolymers can be prepared by copolymerizing vinyl chloride monomers with copolymerizable monomers containing an alkali salt of sulfonic or phosphoric acid and other copolymerizable monomers if necessary. Since these copolymers are based on vinyl synthesis, they can be readily synthesized and adapted to a specific requirement by selecting proper copolymetizable monomers.

The backcoat layer 3 is formed by coating on the reverse side of the support the above-mentioned binder to which carbon black and, if necessary, non-magnetic particles such as barium sulfate are incorporated.

As the material of the support 1, plastics such as polyethylene terephthalate and polypropylene; metals such as Al and Zn; and ceramics such as glass, boron nitride, silicon carbide, porcelain and china are used.

Figure 4:
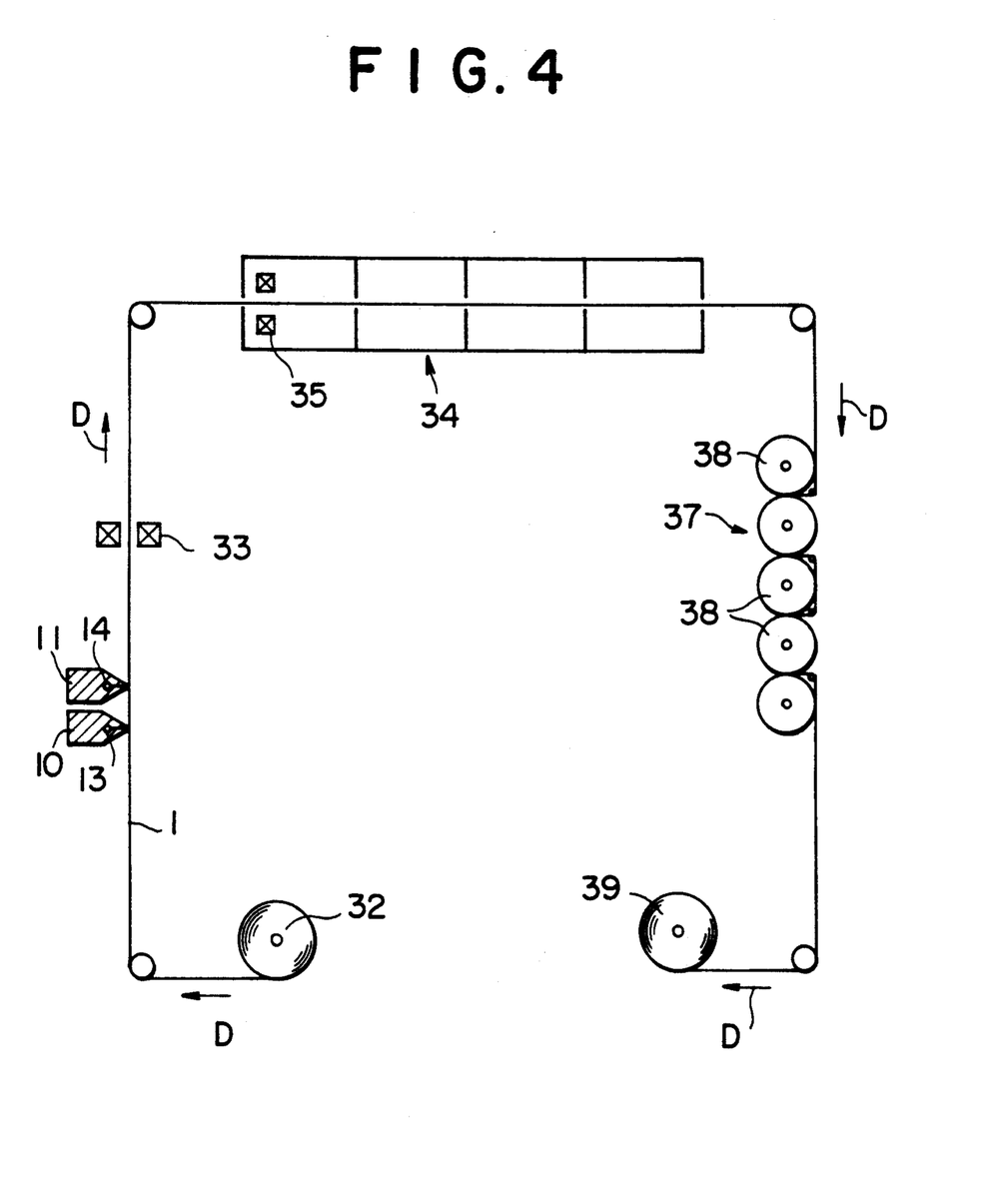
FIG. 4 is a schematic diagram of an example of the manufacturing equipment of the magnetic recording medium.

A schematic diagram of an example of equipment for manufacturing the foregoing recording media is shown in FIG. 4.

In manufacturing the recording medium shown by FIG. 2 with this equipment, a film support 1 delivered from a feed roll 32 is coated with paints for the above magnetic layers 2 and 4 using extrusion coaters 10 and 11, the coated layers are then subjected to orientation by a pre-orienting magnet 33 (2000 Gauss, for example), and then the support is fed into the dryer 34 in which a post-orienting magnet 35 (2000 Gauss, for example) is mounted, where the coated layers are dried with hot air blown from nozzles fitted at high and low positions. Next, the dried support is fed into a super calender 37 composed of calender rolls 38 for calendering, and then rolled up by a take-up roll 39. Each paint may be fed to the extrusion coaters 10 and 11 via unillustrated in-line mixers. In the schematic diagram, an arrow D points the direction in which the film support is carried. Each of the extruding coaters 10 and 11 is equipped with a reservoir 13 and 14 respectively, from which paints are applied by a wet-on-wet method to form a multi-layer structure. In manufacturing the recording medium shown by FIG. 3, one more extrusion coater is added to the layout shown in FIG. 4.

Figure 5A:
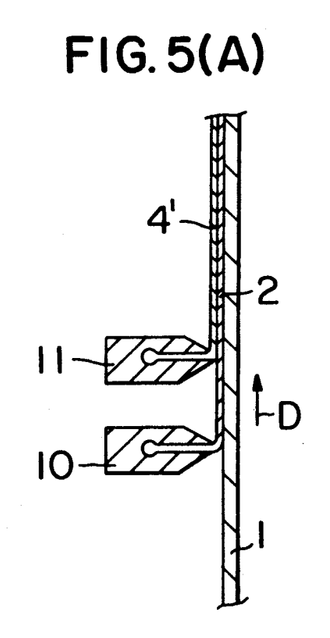
Figure 5B:
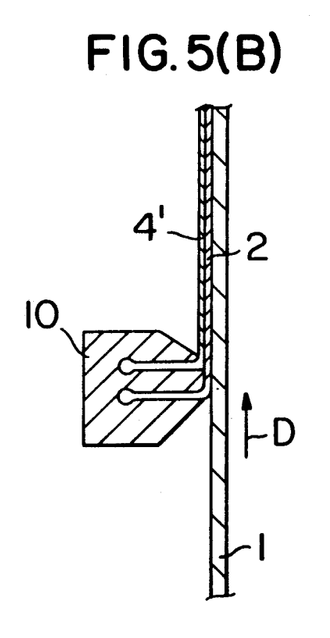
Figure 5C:
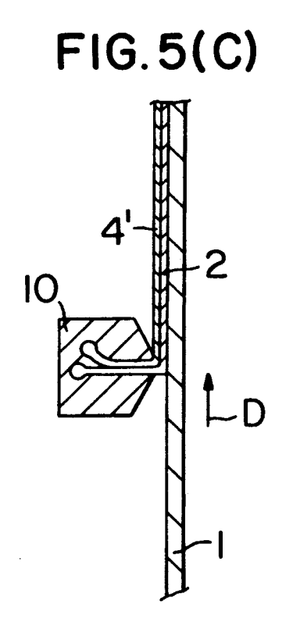

FIG. 5 illustrates extrusion coaters. FIG. 5-(A) illustrates 2-head type coater, for sequential wet-on-wet multi-layer coating the same type as is shown in FIG. 4. FIG. 5-(B) shows a single head type for sequential wet-on-wet multi-layer coating, and FIG. 5-(C) shows a single head type which puts two magnetic paints 2' and 4' together in cross directions in the head and extrudes them for simultaneous wet-on-wet multi-layer coating.

Since the foregoing methods are wet-on-wet ones, the uppermost layer can be readily coated on a lower layer. Particularly, a thin and uniform coating of the uppermost layer can be attained, thereby plural layers can be simultaneously coated with a good reproducibility.

The equipment used for the above multi-layer coating is not necessarily limited to an extruding coater. Other conventional coating equipment can also be used.

EXAMPLES

In the following examples, all "parts" means parts by weight.

EXAMPLES 1 THROUGH 8 AND COMPARATIVE EXAMPLES 1 THROUGH 6

Examples 1 through 6 and Comparative examples 1 through 4 were prepared using various kind of magnetic powder which were different in the SFD value from each other.

| Magnetic paints for the lower magnetic layer | |
|---|---|
| Magnetic powder | 100 parts |
| Kind of magnetic material, Hc and SFD are shown in Table 1 | |
| $\alpha$-$Al_2O_3$ | 5.0 parts |
| Metal sulfonate-containing polyvinyl chloride type resin (MR 110 made by Nippon Zeon) | 6.0 parts |
| Potassium sulfonate-containing polyurethane resin (UR 8300 made by Toyobo) | 11.0 parts |
| Carbon black | 3.0 parts |
| Stearic acid | 0.5 part |
| Oleic acid | 0.5 part |
| Butyl stearate | 1.0 part |
| Methyl ethyl ketone | 200 parts |
| Toluene | 200 parts |
| Cyclohexanone | 100 parts |
| Magnetic paints for the upper magnetic layer | |
| Magnetic powder | 100 parts |
| Kind of magnetic material, Hc and SFD are shown in Table 1 | |
| $\alpha$-$Al_2O_3$ | 5.0 parts |
| Metal-sulfonate-containing polyvinyl chloride type resin (MR 110 made by Nippon Zeon) | 8.0 parts |
| Potassium sulfonate-containing polyurethane resin (UR 8300 made by Toyobo) | 7.0 parts |
| Carbon black | 1.0 parts |
| Stearic acid | 0.5 part |
| Oleic acid | 0.5 part |
| Methyl ethyl ketone | 200 parts |
| Toluene | 200 parts |
| Cyclohexanone | 100 parts |

After kneading and dispersing respectively the magnetic paints for the first and second magnetic layers, 5 parts of a polyisocyanate compound was added to each of them. Then, the magnetic paints were simultaneously coated on a 14.3 μm thick polyethylene terephthalate support by a wet-on-wet method to form the lower magnetic layer having a dry coating thickness of 3.0 μm and the upper magnetic layer having a dry coating thickness of 0.5 μm.

Then, a paint for backcoating having the following composition was coated on the reverse side of the magnetic layers so as to give a dry thickness of 1.0 μm.

| | |
|---|---|
| Carbon black (R-1035 made by Columbia Carbon) | 60 parts |
| Nitrocellulose | 30 parts |
| Potassium-sulfonate containing polyurethane resin (UR 8300 made by Toyobo) | 20 parts |
| Polyisocyanate (Coronate L made by Nippon Polyurethane) | 13 parts |
| Cyclohexanone | 800 parts |
| Methyl ethyl ketone | 1000 parts |
| Toluene | 800 parts |

½-in. wide video tapes were prepared as above. Each tape was then evaluated for the Lumi S/N, Chroma output, HiFi audio output and running durability. The results are shown in Table 1.

TABLE 1

| | Upper Layer | | | | | Lower Layer | | | | |
|---|---|---|---|---|---|---|---|---|---|---|
| | Magnetic powder | | | Dispersing time (min.) | | Magnetic powder | | | Dispersing time (min.) | |
| | Composition | $Fe^{2+}/Fe^{3+}$ (%) | SFDp | Hc | SFD | Composition | $Fe^{2+}/Fe^{3+}$ (%) | SFDp | Hc | SFD |
| Example 1 | Co-γ-FeOx | 7 | 0.51 | 750 | 90 | 0.41 | Co-γ-FeOx | 6 | 0.40 | 800 | 90 | 0.38 |
| Example 2 | Co-γ-FeOx | 8 | 0.51 | 750 | 90 | 0.41 | Co—FeOx | 27 | 0.47 | 800 | 90 | 0.45 |
| Example 3 | Co-γ-FeOx | 7 | 0.51 | 750 | 90 | 0.41 | $CrO_2$ | — | 0.51 | 850 | 90 | 0.49 |
| Example 4 | Co-γ-FeOx | 7 | 0.54 | 900 | 90 | 0.43 | Fe—Al | — | 0.45 | 1100 | 90 | 0.45 |
| Example 5 | Co—FeOx | 28 | 0.52 | 650 | 90 | 0.40 | Co—FeOx | 38 | 0.39 | 700 | 90 | 0.40 |
| Example 6 | Co—FeOx | 16 | 0.52 | 720 | 90 | 0.40 | $CrO_2$ | — | 0.48 | 750 | 90 | 0.46 |
| Comparative 1 | Co-γ-FeOx | 8 | 0.49 | 800 | 90 | 0.39 | Co-γ-FeOx | 7 | 0.50 | 750 | 120 | 0.35 |
| Comparative 2 | Co-γ-FeOx | 8 | 0.46 | 750 | 90 | 0.38 | Co-γ-FeOx | 7 | 0.50 | 800 | 30 | 0.61 |
| Comparative 3 | Co-γ-FeOx | 8 | 0.44 | 750 | 30 | 0.48 | Co-γ-FeOx | 12 | 0.47 | 750 | 90 | 0.39 |
| Comparative 4 | Co-γ-FeOx | 8 | 0.37 | 750 | 120 | 0.29 | Co-γ-FeOx | 12 | 0.49 | 800 | 90 | 0.42 |
| Comparative 5 | Co-γ-FeOx | 7 | 0.45 | 740 | 90 | 0.42 | Co-γ-FeOx | 8 | 0.53 | 550 | 90 | 0.61 |
| Comparative 6 | Co-γ-FeOx | 7 | 0.33 | 720 | 90 | 0.29 | Co-γ-FeOx | 8 | 0.50 | 510 | 90 | 0.55 |
| Example 7 | Co-γ-FeOx | 7 | 0.45 | 740 | 90 | 0.42 | Co-γ-FeOx | 8 | 0.50 | 550 | 90 | 0.53 |
| Example 8 | Co-γ-FeOx | 7 | 0.40 | 720 | 90 | 0.42 | Co-γ-FeOx | 8 | 0.50 | 510 | 90 | 0.55 |

| | Electro-magnetic property | | | Running durability | |
|---|---|---|---|---|---|
| | Lumi S/N | Chroma output | Hifi audio output | 400 passes | 200 passes |
| Example 1 | 0 | 0 | 0 | 5 | 5 |
| Example 2 | +0.4 | +0.3 | +0.8 | 5 | 5 |
| Example 3 | +0.5 | +0.7 | +0.9 | 5 | 5 |
| Example 4 | +0.7 | +1.1 | +1.4 | 5 | 5 |
| Example 5 | +0.4 | +0.6 | +0.3 | 4 | 5 |
| Example 6 | +0.9 | +1.0 | +1.2 | 5 | 5 |
| Comparative 1 | −0.6 | −0.8 | −1.0 | 4 | 5 |
| Comparative 2 | −0.5 | −0.4 | −0.6 | 1 | 2 |
| Comparative 3 | −0.1 | −1.2 | −1.4 | 3 | 4 |
| Comparative 4 | −0.6 | −0.6 | −0.8 | 2 | 2 |
| Comparative 5 | −0.5 | −0.8 | −0.9 | 1 | 2 |
| Comparative 6 | −1.2 | −0.9 | −1.3 | 1 | 2 |
| Example 7 | +0.8 | +0.7 | +0.7 | 5 | 5 |
| Example 8 | +0.5 | +0.4 | +0.8 | 5 | 5 |

It is understood from Table 1 that both of the output and S/N ratio are improved by setting the SFD of each magnetic layer within the range of the present invention.

EXAMPLES 9 THROUGH 12

When the foregoing magnetic layer was formed in a trilayer structure as shown in Table 2, in which thicknesses of the layers were; the uppermost layer: 0.3 μm, the intermediate layer: 0.7 μm, the lower layer: 2.4 μm, good properties shown in Table 3 were obtained by properly setting the SFDs of the uppermost, intermediate and lower layers. In the examples, Co-adhered $Fe_2O_3$ magnetic powders having various SFD values, which were different in the $Fe^{+2}/Fe^{+3}$ ratio from each other, were respectively used in each layers as shown in Table 3.

TABLE 2

| | Magnetic paint for the lowermost magnetic layer | | | | Magnetic paint for the intermediate magnetic layer | | | |
|---|---|---|---|---|---|---|---|---|
| | Magnetic powder | | | Dispersing | Magnetic powder | | | Dispersing |
| | Hc (Oe) | $Fe^{2+}/Fe^{3+}$ (%) | SFDp | time (min.) | Hc (Oe) | $Fe^{2+}/Fe^{3+}$ (%) | SFDp | time (min.) |
| Example 9 | 670 | 32 | 0.56 | 90 | 650 | 32 | 0.45 | 90 |
| Example 10 | 560 | 27 | 0.49 | 70 | 600 | 9 | 0.46 | 70 |
| Example 11 | 670 | 32 | 0.56 | 90 | 650 | 32 | 0.45 | 90 |
| Example 12 | 560 | 12 | 0.47 | 90 | 600 | 9 | 0.46 | 70 |
| Comparative 7 | 560 | 12 | 0.47 | 90 | 600 | 9 | 0.46 | 90 |
| Comparative 8 | 560 | 12 | 0.35 | 180 | 600 | 9 | 0.55 | 30 |
| Comparative 9 | 560 | 12 | 0.52 | 30 | 600 | 9 | 0.55 | 30 |

| | Magnetic paint for the uppermost magnetic layer | | | | Video tape | | |
|---|---|---|---|---|---|---|---|
| | Magnetic powder | | | Dispersing | SDF of the lowermost magnet layer | SFD of the intermediate magnet layer | SFD of the uppermost magnet layer |
| | Hc (Oe) | $Fe^{2+}/Fe^{3+}$ (%) | SFDp | time (min.) | | | |
| Example 9 | 690 | 7 | 0.39 | 90 | 0.53 | 0.42 | 0.36 |
| Example 10 | 630 | 8 | 0.41 | 50 | 0.48 | 0.45 | 0.44 |
| Example 11 | 620 | 8 | 0.41 | 30 | 0.53 | 0.42 | 0.45 |
| Example 12 | 690 | 7 | 0.39 | 90 | 0.44 | 0.45 | 0.36 |
| Comparative 7 | 690 | 7 | 0.45 | 60 | 0.48 | 0.45 | 0.48 |
| Comparative 8 | 690 | 7 | 0.42 | 90 | 0.29 | 0.61 | 0.44 |
| Comparative 9 | 690 | 7 | 0.42 | 90 | 0.61 | 0.61 | 0.44 |

TABLE 3

| | Chroma (dB) | | Lumi (dB) | |
|---|---|---|---|---|
| | Output | S/N | Output | S/N |
| Example 9 | +2.4 | +5.8 | +1.8 | +4.9 |
| Example 10 | +1.9 | +6.2 | +0.9 | +4.5 |
| Example 11 | +1.2 | +0.1 | +1.3 | +2.1 |
| Example 12 | +0.2 | +0.6 | +1.0 | +0.8 |
| Comparative 7 | −1.8 | −1.2 | −1.4 | −2.1 |
| Comparative 8 | −1.4 | −0.9 | −1.7 | −2.4 |
| Comparative 9 | −1.8 | −1.5 | −1.5 | −2.5 |

In the above-mentioned examples, the properties of the samples were evaluated by the following methods.

SFD

The hysteresis curve of the video tape sample was measured by a vibrating-sample magnetometer for determining the SFD value of the sample.

SFDp

The SFDp value measured by the following method was defined as the SFD value of a magnetic powder itself. One hundred parts by weight of the magnetic powder to be measured was dispersed in 20 parts by weight of polyurethane binder using a proper solvent and coated on a base film and dried so as to form a layer having thickness of 3 μm. The hysteresis of thus obtained sample was measured to determined SFDp value in the same manner as in the measurement of SFD.

Chroma S/N and Lumi S/N

These properties were measured in ordinary procedures using a color video noise meter, Shibasoku 925 D/1 manufactured by Shibasoku Co., Ltd. The measured results were represented the relative values in dB with respect to that of the sample of Example 1.

RF Output

RF output of 4 MHz was measured by a VTR deck for measurement. The measured result was represented by the relative value in dB with respect to that of the sample of Example 1.

RF Output

Chroma output of 500 kHz was measured by the same VTR used for measuring RF output. The measured result was represented by the relative value in dB with respect to that of the sample of Example 1.

HiFi Audio Output

On the sample tape to be measured, FM carrier signals of 1.3 MHz and 1.7 MHz were recorded by a FM audio recording head of the VTR deck, and a gray scale signal was recorded with a standard recording current to be overlapped with the recorded audio signals. The recorded signals were reproduced to measure the output of the FM carrier signal of 1.7 MHz. The measured result was represented by the relative value in dB with respect to the measurement of the sample of Example 1.

Running Durability

The sample tape to be measured was repeatedly passed through the VTR deck and damage on the sample, breaks at edge and scratches on back surface of the tape, formed on the sample was visually checked after 200 and 400 pass. The test result was represented by the following five ranking.

5: Good, no damage was formed.
4: Acceptable, a little scratches were formed.
3: Some breaks at edge and considerable scratches on back surface were formed.
2: Breaks were formed over the full length of sample.

1: The sample became to impossible to run during the test.

What is claimed is:

1. A magnetic recording medium comprising a first magnetic layer and a second magnetic layer provided on a support in this order from said support wherein said first magnetic layer has an SFD value of from 0.38 to 0.60 and said second magnetic layer has an SFD value of from 0.30 to 0.45, wherein SFD is defined as follows:

$$SFD = \Delta H/Hc$$

where $\Delta H$ is a half-width of magnetic field at the maximum value of a differential curve of a magnetic induction-magnetic field hysterisis curve, and Hc is a coercive force of a magnetic material.

2. The recording medium of claim 1, wherein said first magnetic layer has a SFD value of from 0.40 to 0.55, and said second magnetic layer has a SFD value of from 0.32 to 0.42.

3. The recording medium of claim 2, wherein said first magnetic layer has a SFD value of from 0.45 to 0.52, and said second magnetic layer has a SFD value of from 0.32 to 0.38.

4. The recording medium of claim 1, wherein said first magnetic layer has a coercive force of from 500 Oe to 680 Oe and said second magnetic layer has a coercive force of from 630 Oe to 750 Oe.

* * * * *